Figure 2:
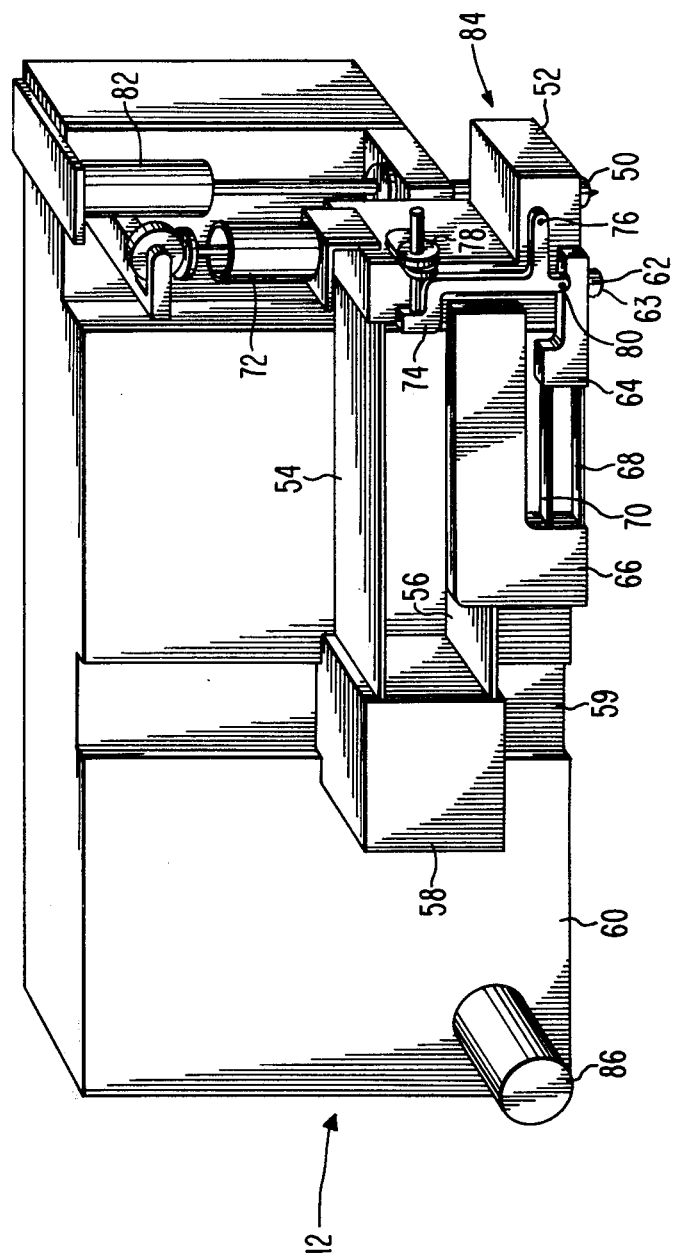

United States Patent [19]

Castle

[11] 4,317,192
[45] Feb. 23, 1982

[54] HEAD SUSPENSION VELOCITY CONTROL APPARATUS FOR ELECTROMECHANICAL RECORDER

[75] Inventor: Richard M. Castle, Indianapolis, Ind.

[73] Assignee: RCA Corporation, New York, N.Y.

[21] Appl. No.: 106,523

[22] Filed: Dec. 26, 1979

[51] Int. Cl.³ .................. G11B 17/00; G11B 21/16; G11B 11/00; G11B 3/00

[52] U.S. Cl. .................. 369/244; 369/246; 369/13; 369/132; 369/126

[58] Field of Search ............. 360/100.4 C; 274/13 R, 274/23 A, 46, 23 R; 369/244, 246, 13, 126, 132

[56] References Cited

U.S. PATENT DOCUMENTS

| | | | |
|---|---|---|---|
| Re. 29,113 | 1/1977 | Halter | 358/128 |
| 2,845,802 | 8/1958 | Brown, Jr. et al. | 274/13 R |
| 3,023,011 | 2/1962 | Wagner | 274/13 R |
| 3,490,771 | 1/1970 | Bauer | 179/100.4 C |
| 3,572,724 | 3/1971 | Rabinow | 274/13 R X |
| 3,835,262 | 9/1974 | Moritz et al. | 179/100.4 C |
| 3,963,861 | 6/1976 | Crooks | 274/23 A X |
| 4,030,815 | 6/1977 | Andrevski et al. | 350/255 |
| 4,035,590 | 7/1977 | Halter | 179/100.41 P |
| 4,059,277 | 11/1977 | DeStephanis | 274/23 A |
| 4,060,831 | 11/1977 | Halter | 358/128 |
| 4,120,504 | 10/1978 | Brecht | 274/23 A |
| 4,131,284 | 12/1978 | Rangabe | 274/23 R |
| 4,135,722 | 1/1979 | Paulson et al. | 274/23 A |

Primary Examiner—Aristotelis M. Psitos
Attorney, Agent, or Firm—J. E. Roehling; J. S. Tripoli; E. M. Whitacre

[57] ABSTRACT

A diamond stylus for electromechanically recording short wavelength video signal information in a metal disc master is supported in a cutterhead suspension apparatus. A set of parallel spring steel suspension members are used to mount a cutting stylus assembly including the diamond stylus to an electromechanical recording lathe. A cutterhead suspension velocity control apparatus couples the cutterhead suspension apparatus to the main frame of the electromechanical recording lathe. When the cutterhead suspension is lowered onto the disc master surface the velocity control apparatus controls the rate at which the cutterhead suspension descends to the disc master surface.

3 Claims, 3 Drawing Figures

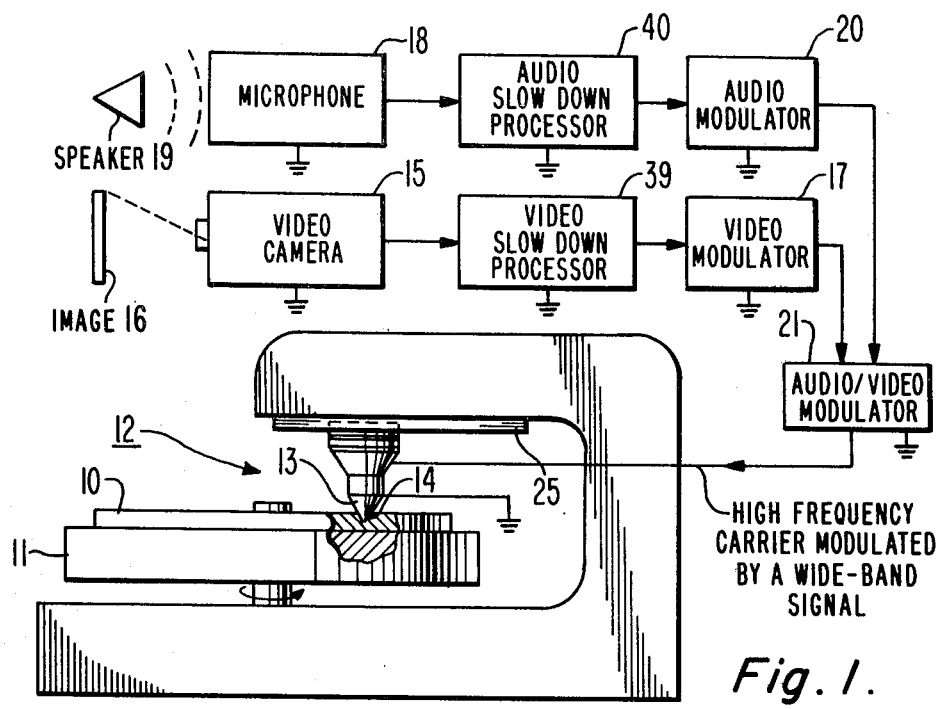
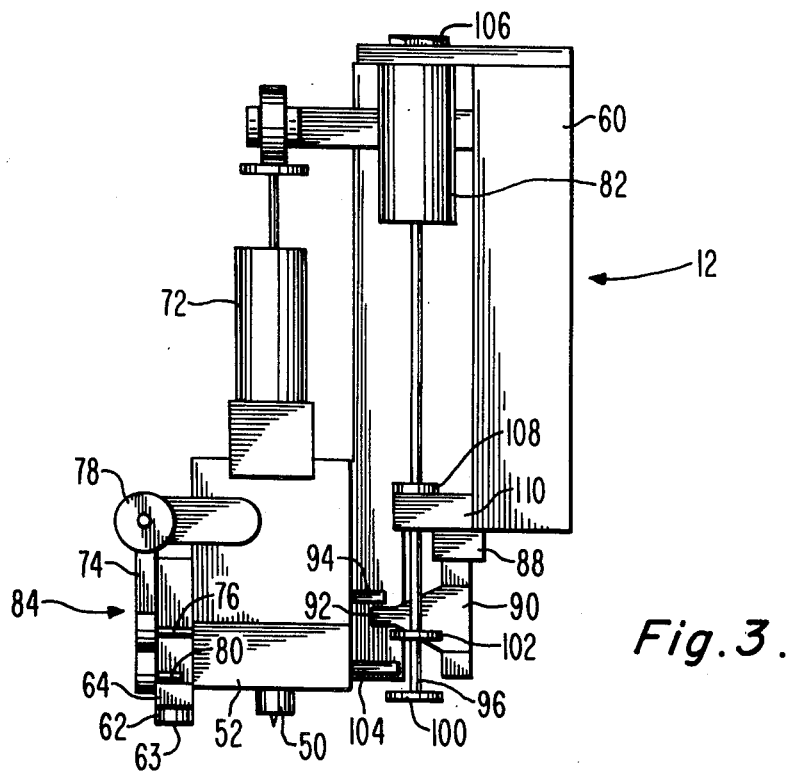
Fig. 1.
Fig. 3.

HEAD SUSPENSION VELOCITY CONTROL APPARATUS FOR ELECTROMECHANICAL RECORDER

The present invention relates generally to electromechanical recording apparatus used to record short wavelength, high density information in a substrate and more particularly to apparatus for recording video and audio information in a master video disc record.

An electromechanical apparatus for recording high density, short wavelength information signals into a metal (e.g., copper) substrate is described in an application filed on even date herewith for G. John, entitled "Dual Parallelogram Cutterhead Suspension Apparatus". In the system described therein a plastic video disc record is stamped from a mold which is produced from the substrate. Since the playback time of a video disc record is directly proportional to the number of grooves per inch in the disc and inversely proportional to the playback speed, a high playback speed (illustratively, 450 rpm) requires a large number of grooves per inch in the disc record (illustratively, 9600 gpi) for a reasonably long playback time (illustratively, 1 hour on each side). In other words, in the aforesaid type of video disc system, the groove convolutions are very closely spaced (e.g., 2.6 micrometers) in order to accommodate the information necessary for storing a video program of an acceptable quality and a reasonable playback time.

It is desirable to record high density information signals in a metal master with a piezoelectric/diamond cutterhead. A cutterhead for electromechanically recording a video signal is described in U.S. Pat. No. Re. 29,113, issued to J. B. Halter on Jan. 11, 1977, entitled "Triangular Piezoelectric Transducer for Recording Video Information". Wideband electromechanical recording systems for recording video signals into a disc master are described in U.S. Pat. No. 4,044,379 to J. B. Halter, issued Aug. 23, 1977, entitled "Method and Apparatus for Electromechanical Recording of Short Wavelength Modulation in a Metal Master" and U.S. Pat. No. 4,060,831 to J. B. Halter, issued Nov. 29, 1977, entitled "Wideband Electromechanical Recording System".

In the system described in the aforementioned John application an electromechanical cutterhead and air puck are suspended by a pair of spring steel members from the main frame of a recording lathe. A lifting lever holds a mounting block on which the cutterhead and air puck are attached in a ready position above the surface of the master prior to the start of recording. When the lifting lever is lowered out of engagement with the cutterhead mounting block, the suspension assembly (i.e., the mounting block, cutterhead and air puck) descends until the air pressure from the air puck supports the assembly a few micrometers above the master surface.

A problem associated with lowering the suspension assembly to the surface of a master is the potential impact between the suspension assembly and the surface of the master. If the assembly descends too fast the diamond stylus on the assembly may cut too deeply into the disc surface before the air pressure of the air puck stabilizes the position of the suspension assembly a few micrometers above the master surface. If any part of the suspension assembly makes an undesired contact with the surface of the master, the master or air puck or other part of the suspension assembly may be damaged.

Pursuant to the principles of the present invention a cutterhead suspension velocity control apparatus is provided for reducing or eliminating any damage due to the suspension assembly descending too fast.

According to a feature of the present invention, apparatus having a platform for supporting a substrate, a first frame member and a second frame member is provided for electromechanically recording information signals on a substrate. Attached to the first frame member are means for cutting undulations representative of the information signals in a surface of the substrate and means for supporting the cutting means such that the cutting means cuts into the substrate to a given nominal depth. Resilient means are provided for coupling the first frame member to the second frame member. Further, the apparatus includes means for supporting the first frame member in a given position such that the cutting means and supporting means are retracted out of contact with the surface of the substrate which is supported on the platform. Additionally, means for regulating the rate at which the first frame member descends to the substrate surface from the given position is provided.

Other features and advantages of the invention will be more fully understood from the following detailed description of the preferred embodiment, the appended claims, and the accompanying drawing in which:

FIG. 1 illustrates, partly via a block diagram representation, a system for electromechanically cutting a groove in a metal master having an information track comprising short wavelength modulation of groove depth pursuant to the principles of the present invention; and FIGS. 2 and 3 illustrate, respectively, a perspective and a front view of the suspension apparatus for use with the system of FIG. 1 pursuant to the principles of the present invention.

FIG. 1 illustrates a system for electromechanically cutting a groove in a metal master 10 having an information track comprising short wavelength modulation of groove depth. The metal master 10 is placed on a turntable 11 in operating relationship with suspension head 12 including a diamond stylus 13. The cutting stylus 13 is positioned with respect to the metal master 10 such that a groove 14 having a quiescent groove depth less than 1 micrometer is cut while relative motion is established between stylus 13 and metal master 10. In one preferred arrangement, head suspension 12 is moved linearly on slide 25 while turntable 11 is rotated such that stylus 13 cuts a spiral groove in a disc shaped metal master. The cutting stylus 13 is vibrated in response to a relatively high frequency signal (e.g., approximately 5 MHz) while cutting the groove in order to effect short wavelength modulation of the groove depth having a peak-to-peak dimension which is typically less than the groove depth. The electromechanical recording of short wavelength modulation in a metal master provides a high signal-to-noise ratio.

The formation of the relatively high frequency signal (the time variation of which is represented by the spatial variation in the groove bottom) will now be described with reference to FIG. 1 by way of example only. Illustratively, a video camera 15 scans an image 16 for developing a video signal at the output thereof. The video signal may include components representative of the luminance and chrominance of the scanned image 16. The output signal of the video camera 15 is sloweddown (e.g., by a factor of two) by a video slow-down processor 39 in order to accommodate the bandwidth of the cutterhead. A video modulator 17, coupled to the video slow-down processor 39, frequency modulates a slowed-down high frequency carrier over a high frequency deviation range (e.g., of the order of 4.8/2–6.8/2 MHz) in accordance with the slowed-down video signal.

Simultaneously, a microphone 18 picks up an audio signal accompaniment of the video signal from a speaker 19. The output signal of the microphone 18 is likewise slowed-down (e.g., also by a factor of two) by an audio slow-down processor 40 in order to synchronize the audio signal with the slowed-down video signal. An audio modulator 20, coupled to the audio slow-down processor 40, frequency modulates a slowed-down low frequency carrier over a low frequency deviation range (e.g., of the order of 716/2+50/2 KHz) in accordance with the slowed-down audio signal developed at the output of the microphone 18. An audio/video modulator 21 modulates the once-modulated, slowed-down, high frequency carrier in accordance with the once-modulated, slowed-down, low frequency carrier as described in the aforementioned Halter U.S. Pat. No. 4,044,379. A relatively high frequency signal at the output of the audio/video modulator 21 energizes cutting stylus 13 during the recording operation in order to effect short wavelength modulation of groove depth (e.g., 0.6–1.6 micrometers) while cutting groove 14 in metal master 10 at a slowed-down recording speed (e.g., 450/2 rpm).

The suspension head 12 described with reference to FIG. 1 is shown in more detail in the perspective view of FIG. 2 and the front view of FIG. 3. Cutting stylus assembly 50 which may be of a type described in the aforementioned Halter U.S. Pat. No. 29,113 is mounted to mounting block 52 which, in turn, is mounted via spring steel members 54, 56 to mounting block 52 via spring members 54, 56 and mounting block 58. Base 60 provides a structure suitable for mounting to slide 25 of FIG. 1 and for suspending mounting block 58. Resiliently suspended from mounting block 52 is air puck 62 (the air supply is not shown). The air puck 62 which is mounted to mounting block 64 is attached to arm 66 via spring steel members 68, 70. Additionally, mounting block 52 is attached to base 60 through an oil damper mechanism 72. The vertical position of base 63 of air puck 62 relative to the tip of cutting stylus assembly 50 may be adjusted by lever 74 which is pivoted on pin 76. When screw 78 is turned forcing lever 74 to rotate in a counterclockwise direction about pin 76, a pin 80 urges mounting block 64 and thereby air puck 62 down. On the other hand when screw 78 is turned in the opposite direction air puck 62 is urged up by the biasing force of spring members 68, 70.

In operation the suspension head 12 controls the depth of cut made by the diamond stylus attached to cutting stylus assembly 50. Mounting block 52 is lowered slowly (the lowering velocity of block 52 is controlled by air dashpot 82 which will be discussed in greater detail herein) until the base 63 of air puck 62 is a few micrometers from the disc surface (not shown in FIG. 2) i.e., until the air pressure between base 63 of air puck 62 and the recording master surface equalizes the gravitational force of suspension assembly 84. It should be noted that before suspension assembly 84 is lowered, lever 74 is adjusted such that stylus assembly 50 will not engage the metal master when the air puck is in its lowered position. With air puck 62 riding a few micrometers above the metal master surface screw 78 is adjusted so that the tip of cutting stylus assembly 50 is nearly touching the surface of the metal master thus placing cutting stylus assembly 50 in a ready position. To start a cut, the air pressure to air puck 62 is decreased causing the tip of stylus assembly 50 to enter the metal master surface to a quiescent depth (illustratively, the nominal depth of cut is approximately 0.5 μm).

With the parallel beam arrangement as illustrated in FIG. 2, the active surface (i.e., base 63) of air puck 62 may be maintained parallel to the surface of a metal master and simultaneously the angle that stylus assembly 50 makes with a metal master surface may be maintained substantially constant such that the undulations cut into an information track are a substantially faithful representation of the information signals. Further, the relative position of base 63 with respect to the tip of stylus assembly 50 may be adjusted by screw 78 without affecting the parallelism of base 63 or the angle of stylus assembly 50.

Stray mechanical resonances may be deleterious to the recording process. In order to reduce undesired resonances, spring steel members 54, 56, 68, 70 may be coated with a vibration damping compound such as Sound-Off, a product of Quaker State Refining Corp. Additionally, oil dashpot 72 aids in reducing any unwanted resonances.

In the embodiment shown in FIG. 2, slot 59 which is illustrated in base 60 permits vertical movement of mounting block 58 on base 60. The preload (i.e., bias) of spring steel members 54, 56 may be adjusted by varying the vertical position of mounting block 58.

Mounted on the side of base 60 is a motor 86 which is used to lift suspension assembly 84 out of contact with the metal master when a recording is complete. The operation of this lifting mechanism as well as dashpot 82 will be explained now with reference to FIG. 3.

FIG. 3 illustrates a front view of the suspension head 12 shown in FIG. 2. After a master has been cut, motor 86 is activated to rotate cam 88 which engages lever 90. Lever 90 is pivoted on the side base 60 such that as cam 88 is rotated tip 92 of lever 90 moves up contacting pin 94 which, in turn, raises suspension assembly 84. When the stylus is lowered, motor 86 is activated such that lever 90 moves out of engagement with pin 94.

To reduce or eliminate any damage due to suspension assembly 84 descending too fast, a head suspension velocity governor is provided. The head suspension velocity governor comprises air dashpot 82, shaft 96, discs 100, 102 and pin 104. In operation assembly 84 is released by lever 90. After being released it descends effectively in a free fall condition until pin 104 contacts disc 100 of the head suspension velocity governor. When pin 104 comes down into contact with disc 100, the remaining travel of suspension assembly 84 proceeds under the influence of dashpot 82. The suspension assembly 84 now descends very slowly (compared to free fall) until air puck 62 supports it on the metal master surface. Valve 106 of dashpot 82 may be adjusted to vary the rate of descent of assembly 84. By controlling the rate of descent of suspension assembly 84, the chance of assembly 84 crashing into the record surface is eliminated or minimized.

Disc 102 combined with pin 104 provides a system for cocking dashpot 82. When assembly 84 is lifted by lever 90, dashpot 82 is prepared for the next lowering by lifting shaft 96, and thereby the plunger (not shown) of dashpot 82, with pin 104 which contacts disc 102.

In the recording position, shaft 96 should be positioned such that discs 100 and 102 do not interfere with pin 104. For that reason, stop 108 is arranged on shaft 96 to rest on bracket 110, permitting assembly 84 and pin 104 freedom of movement with respect to discs 100, 102.

What is claimed is:

1. In an apparatus for electromechanically recording information signals in a substrate, the apparatus comprising:

a platform for supporting said substrate;

a first means for mounting having a first projection;

means for cutting undulations representative of information signals in a surface of said substrate; said cutting means being attached to said first mounting means;

means for supporting said cutting means such that said cutting means cuts into said substrate surface to a given nominal depth; said supporting means being attached to said first mounting means;

a second means for mounting;

resilient means for coupling said first mounting means to said second mounting means;

means for raising said first mounting means to a given position such that said cutting means and said supporting means are retracted out of contact with said surface of said substrate supported on said platform; and means, attached to said second mounting means, for regulating the rate at which said first mounting means descends to said substrate surface from said given position;

said regulating means includes:

a pin having second and third projections;

said second projection in combination with said first projection attached to said first mounting means providing means for linking said first mounting means to said pin during the descent of said first mounting means;

said third projection in combination with said first projection providing means for priming said regulating means when said first mounting means is returned to said given position.

2. The apparatus according to claim 1 further comprising:

means for positioning said pin such that said first mounting means moves without contacting said second and third projections during signal recording.

3. The apparatus according to claim 2 wherein said regulating means comprises a dashpot for controlling the rate of descent of said first mounting means when said first mounting means is disengaged from said given position.

* * * * *